United States Patent [19]
Matsuno et al.

[11] Patent Number: 5,069,084
[45] Date of Patent: Dec. 3, 1991

[54] CONTROL SYSTEM FOR AN AUTOMATIC TRANSMISSION IN AN AUTOMOTIVE VEHICLE

[75] Inventors: Yuji Matsuno; Yoshinobu Kido; Yoshiharu Sugiyama, all of Hiroshima, Japan

[73] Assignee: Mazda Motor Corporation, Hiroshima, Japan

[21] Appl. No.: 662,577

[22] Filed: Mar. 1, 1991

[30] Foreign Application Priority Data

Mar. 5, 1990 [JP] Japan ................................. 2-53119

[51] Int. Cl.⁵ ............................................. F16H 61/10
[52] U.S. Cl. .................................................... 74/844
[58] Field of Search ..................... 74/844; 475/117, 60

[56] References Cited

U.S. PATENT DOCUMENTS 3,942,393  3/1976  Forster et al. .................. 475/117 X
4,733,581  3/1988  Hasegawa et al. .............. 74/866 X

FOREIGN PATENT DOCUMENTS 48-217  1/1973  Japan .

Primary Examiner—Dirk Wright
Attorney, Agent, or Firm—Wenderoth, Lind & Ponack

[57] ABSTRACT

A control system for an automatic transmission in an automotive vehicle selects an appropriate shift pattern in compliance with the temperature of hydraulic oil contained in a torque converter of the automatic transmission. The control system includes a transmission control unit having a plurality of shift patterns including a first shaft pattern favored for a cold engine and a second shift pattern favored for an engine after warm-up, an oil sensor for detecting the temperature of hydraulic oil contained in or supplied to the torque converter, a timer for counting the time period after engine starting, and a CPU for selecting either the first or second shift pattern. The first shift pattern is selected when the temperature of hydraulic oil is less than a preset value, whereas the second shift pattern is selected when the time set by the timer is up.

5 Claims, 4 Drawing Sheets

CONTROL SYSTEM FOR AN AUTOMATIC TRANSMISSION IN AN AUTOMOTIVE VEHICLE

BACKGROUND OF THE INVENTION

1. Field of the Invention

The present invention relates to a control system for an automatic transmission to be mounted on an internal combustion engine in an automotive vehicle, and is applicable particularly to a control system for switching shift patterns in compliance with the temperature of hydraulic oil contained in a torque converter of the automatic transmission.

2. Description of the Prior Art

Recently, an automotive vehicle provided with an automatic transmission capable of selecting any one of a plurality of shift patterns suitable for various running conditions has been commercially available. The most appropriate shift pattern varies according to the running conditions on flat ground, in mountains, or in overcrowded cities in traffic in which acceleration and deceleration are frequently required.

Japanese Patent Publication (examined) No. 48-217 discloses a control system for an automatic transmission, in which a shift point is changed according to the temperature of engine cooling water, engine lubricating oil, an engine block, hydraulic oil of a torque converter or the like. Each of these parameters varies in temperature according to the running conditions of an automotive vehicle. The shift point is changed by changing the setting conditions for shifting upon receipt of a signal from an electric signal generating means for generating an electric signal responsive to the temperature of the above parameters.

In this control system, when the temperature of cooling water is low before much time elapses after engine starting, the running range covered by low speed gears is extended to the high speed side, thereby supplementing power reduction until the engine becomes warm.

More specifically, while the temperature of engine cooling water reaches an appropriate range after engine starting, the switching of shift patterns of the engine is controlled according to the temperature of the engine cooling water or the like. However, since a signal indicative of the temperature of the engine cooling water is generally supplied to an engine control unit for controlling the engine, this signal must be transmitted via a signal line, which communicates between the engine control unit and a transmission control unit. Because of this, the above conventional control system needs a lead wire for electrically connecting the engine control unit and the transmission control unit, thereby increasing the number of lead wires in a wire harness, complicating connectors thereof and increasing the manufacturing cost.

In the meantime, there is a correlation between the temperature of engine cooling water and that of hydraulic oil contained in a torque converter of an automatic transmission. In general, the temperature of hydraulic oil of the torque converter rises with a temperature rise of engine cooling water. In view of this correlation between the temperature of engine cooling water and that of hydraulic oil of the torque converter, it is possible to control the switching of shift patterns with the temperature of hydraulic oil of the torque converter being employed as control parameter for the transmission.

However, there is not always a correlation between the temperature of engine cooling water and that of hydraulic oil of the torque converter of the automatic transmission. This correlation would be lost, for example, in the following case.

When idling conditions are continued for more than a certain time period after engine starting, the temperature of engine cooling water rises but the temperature rise of hydraulic oil of the torque converter is relatively small.

Even in this case, if the switching of shift patterns is controlled on the basis of the temperature of hydraulic oil of the torque converter and if the idling conditions are continued for a long time after engine starting, the running range covered by low speed gears is unnecessarily extended to the high speed side The reason for this is that the transmission is controlled by a shift pattern favored for a cold engine, although the engine has become warm. As a result, the problem arose that the fuel consumption increased.

SUMMARY OF THE INVENTION

The present invention has been developed to overcome the above-described disadvantages.

It is accordingly an object of the present invention to provide a control system for an automatic transmission in an automotive vehicle, which is capable of preventing the running performance of the automotive vehicle from being lowered in the running conditions in which a correlation between the temperature of engine cooling water and that of hydraulic oil contained in a torque converter of the automatic transmission is lost, in the case where the switching of shift patterns of the transmission is controlled upon detection of the temperature of hydraulic oil of the torque converter.

In accomplishing this and other objects, a control system according to the present invention selects an appropriate shift pattern in compliance with the temperature of hydraulic oil of torque converter.

The control system includes a transmission control unit having a plurality of shift patterns including a first shift pattern favored for a cold engine and a second shift pattern favored for an engine after warm-up oil temperature detector means for detecting the temperature of hydraulic oil of the torque converter, timer means for counting the time period after engine starting, and shift pattern selector means for selecting the first shift pattern when the temperature of hydraulic oil is less than a preset value, the shift pattern selector means selecting the second shift pattern when the time set by the timer means is up.

According to the present invention, when the temperature of the hydraulic oil is low at the time of engine starting, the first shift pattern favored for a cold engine is selected. Accordingly, the control of the transmission is properly conducted by the temperature of hydraulic oil contained in the torque converter.

BRIEF DESCRIPTION OF THE DRAWINGS

This and other objects and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

Figure 1:
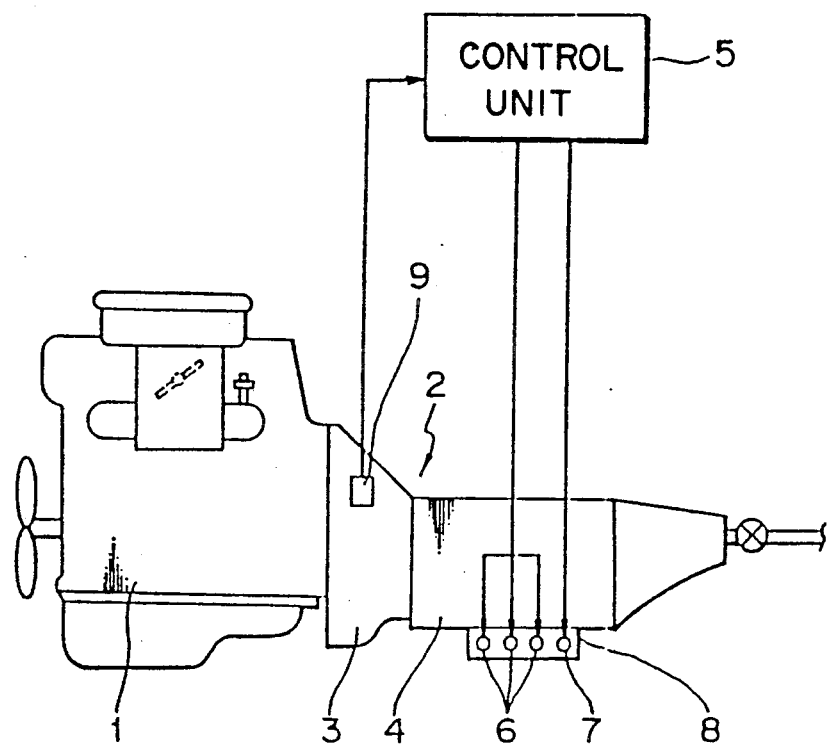
FIG. 1 is a schematic view of an internal combustion engine provided with an automatic transmission to which the present invention is applied.

Referring now to the drawings, there is schematically shown in FIG. 1 an internal combustion engine 1 provided with an automatic transmission 2, to which the present invention is applied.

In FIG. 1, the power from an engine 1 is transmitted to drive wheels (not shown) via an automatic transmission 2.

The automatic transmission 2 comprises a torque converter 3 and a planetary gear type multi-stage transmission mechanism 4. The multi-stage transmission mechanism 4 includes four stages for the forward run movement in this embodiment. Upon receipt of a switching signal from a transmission control unit 5, the multi-stage transmission mechanism 4 changes the combination of energization and deenergization of a plurality of solenoids 6 for shifting use and a solenoid 7 for lockup use, thereby switching the operation modes of a hydraulic actuator 8. In this way, the switching for shifting is conducted and a lockup clutch is turned on or off.

The transmission control unit 5 includes a microcomputer comprising a CPU, a ROM, a RAM, a timer, and input/output interface circuits including an A/D converter, a D/A converter, and the like.

Figure 2:
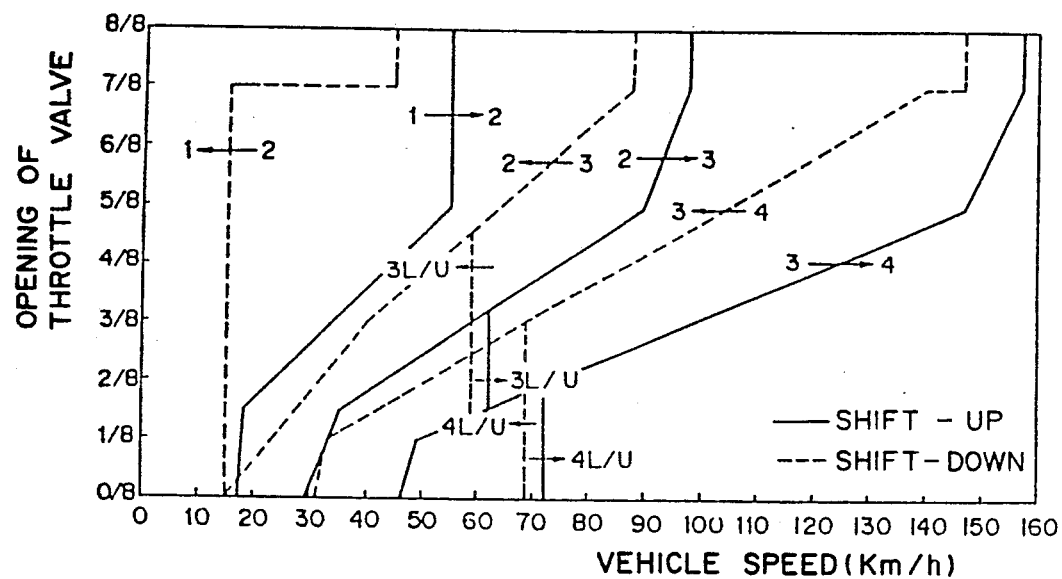
FIG. 2 is a shift map indicative a shift pattern favored for a cold engine.
Figure 3:
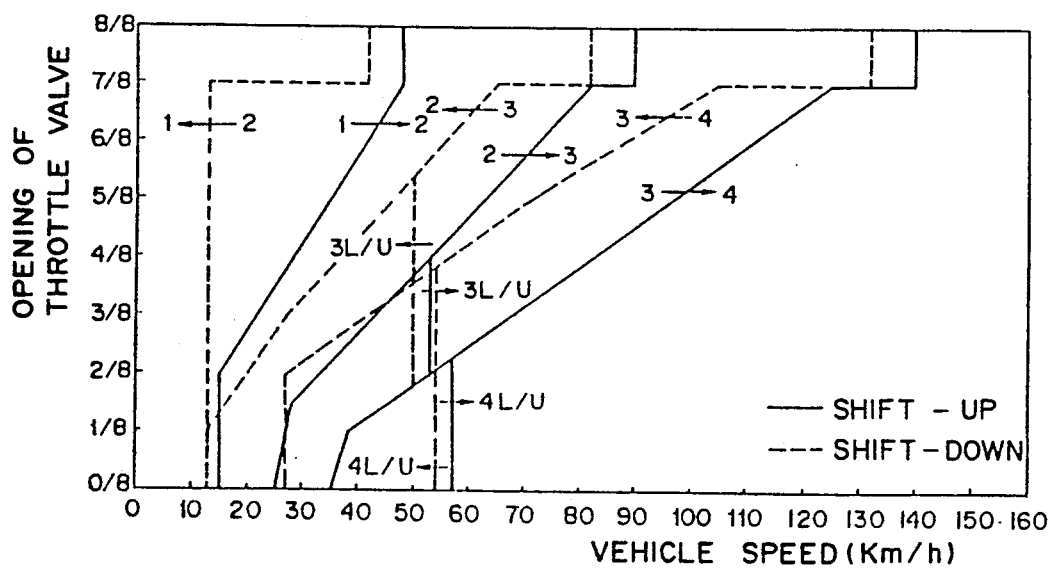
FIG. 3 is a shift map indicative of a normal shift pattern favored for an engine after warm-up.

FIGS. 2 and 3 represent shift maps indicative of shift characteristics, i.e. the relationship between engine load and the vehicle speed, when the engine is cold and when the engine has been warmed up, respectively. The engine load is represented by the opening of a throttle valve. The shift characteristics as shown in FIGS. 2 and 3 are selected in compliance with the running conditions of an automotive vehicle with the automatic transmission 2. These characteristics, a program executed by the CPU, and the like are stored in the ROM.

At the time of engine starting, upon receipt of a signal from an oil sensor 9 for detecting the temperature of hydraulic oil of the torque converter 3 of the automatic transmission 2, the CPU selects an appropriate shift map and outputs a switching signal to the hydraulic actuator 8.

Figure 4:
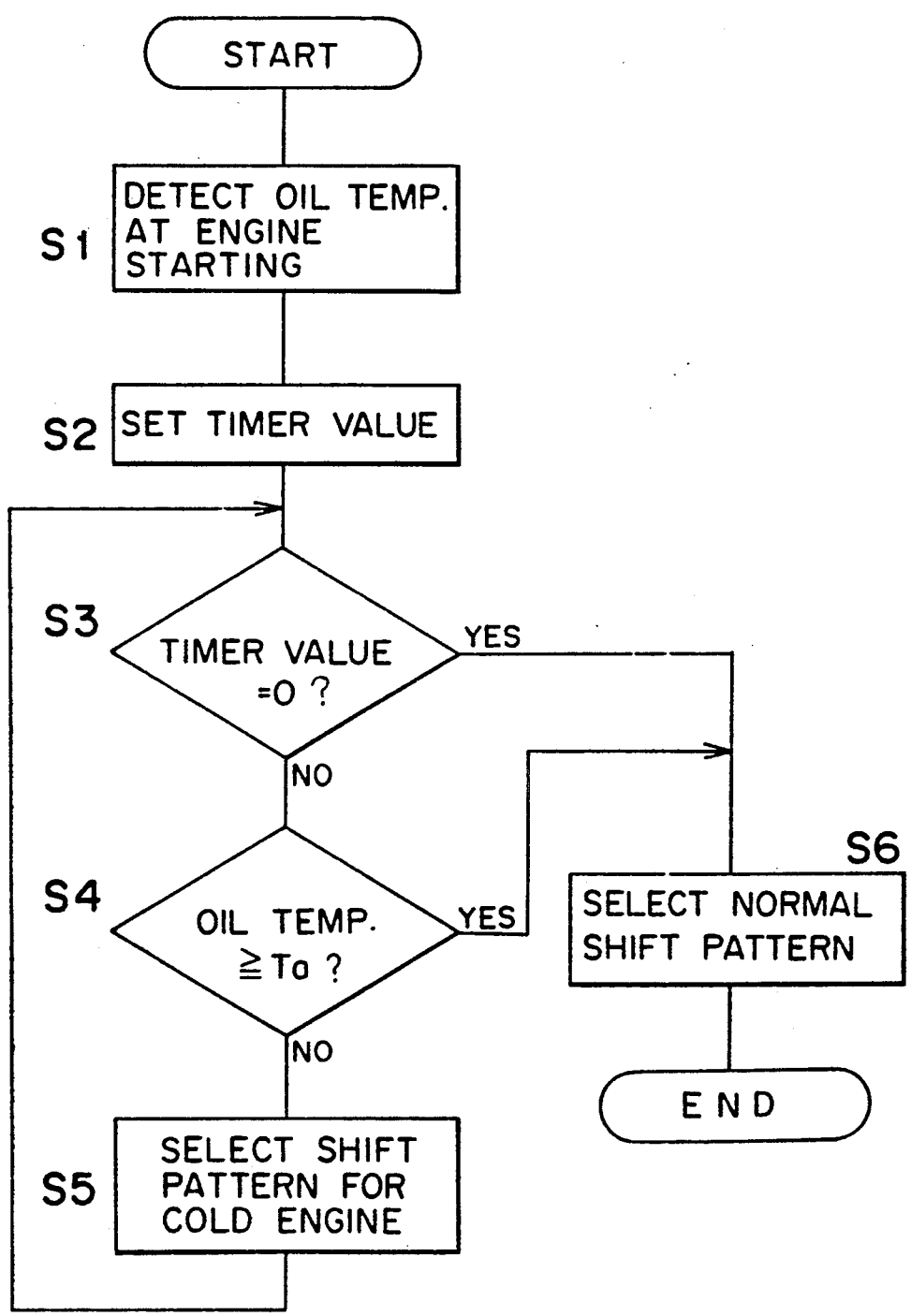
FIG. 4 is a flowchart indicative of a control operation conducted by a transmission control unit.

The control for selecting the shift maps is conducted by the transmission control unit 5 of FIG. 1 and will be discussed hereinafter with reference to FIG. 4 indicating a flowchart for selecting the shift maps.

The temperature Tx of hydraulic oil of the torque converter 3, which is input by the oil sensor 9, is initially read at step S1 at the time of engine starting.

Figure 5:
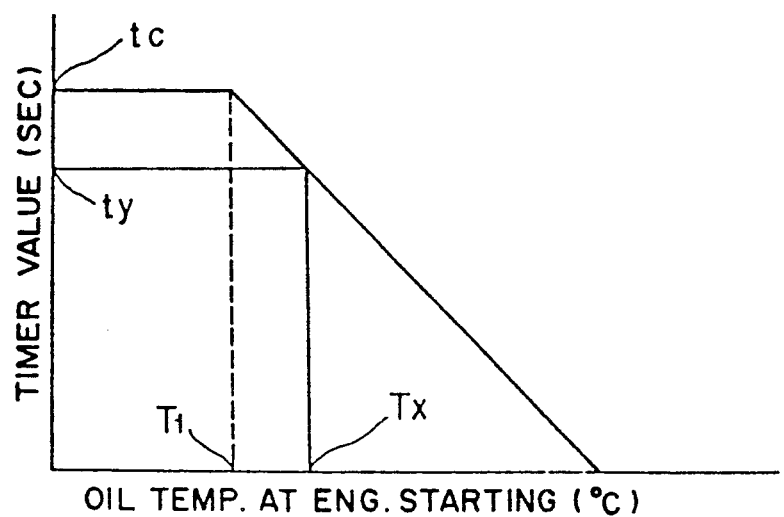
FIG. 5 is a graph indicative of the relationship between a time period to be set by an internal timer and the temperature of hydraulic oil contained in a torque converter.

At step S2, the CPU sets the timer value (ty) of an internal timer to a constant value (tc) until the oil temperature Tx reaches a maximum temperature T1 in a temperature range being regarded as low temperatures, as shown in FIG. 5. When the oil temperature Tx exceeds this value T1, the timer value (ty) linearly decreases with the increase of the oil temperature Tx.

Upon determination of the timer value ty, it is determined at step S3 whether the timer value (ty) is equal to, i.e. whether the time set by the internal timer is up after engine starting. If the time is not up, it is determined at step S4 whether the oil temperature Tx in the torque converter 3 is greater than or equal to a preset oil temperature Ta. If the oil temperature Tx in the torque converter 3 is less than the preset value Ta at step S4, the procedure proceeds to step S5 where the transmission control unit 5 selects a shift pattern of FIG. 2 favored for the cold engine, and a loop consisting of the steps S3 to S5 is repeated.

In contrast, if the oil temperature Tx in the torque converter 3 becomes greater than or equal to the preset value Ta at step S4, the engine 1 is regarded as having escaped from the cold condition. In this event, even if the time set by the internal timer is not up, the transmission control unit 5 never fails to execute step S6 to select the normal shift pattern of FIG. 3 favored for the engine 1 after warm-up.

Even if the oil temperature Tx does not reach the preset value Ta, the transmission control unit 5 selects the normal shift pattern at step S6 when it is determined at step S3 that the time set by the internal timer in compliance with the oil temperature Tx has elapsed after the engine starting.

Figure 6A:
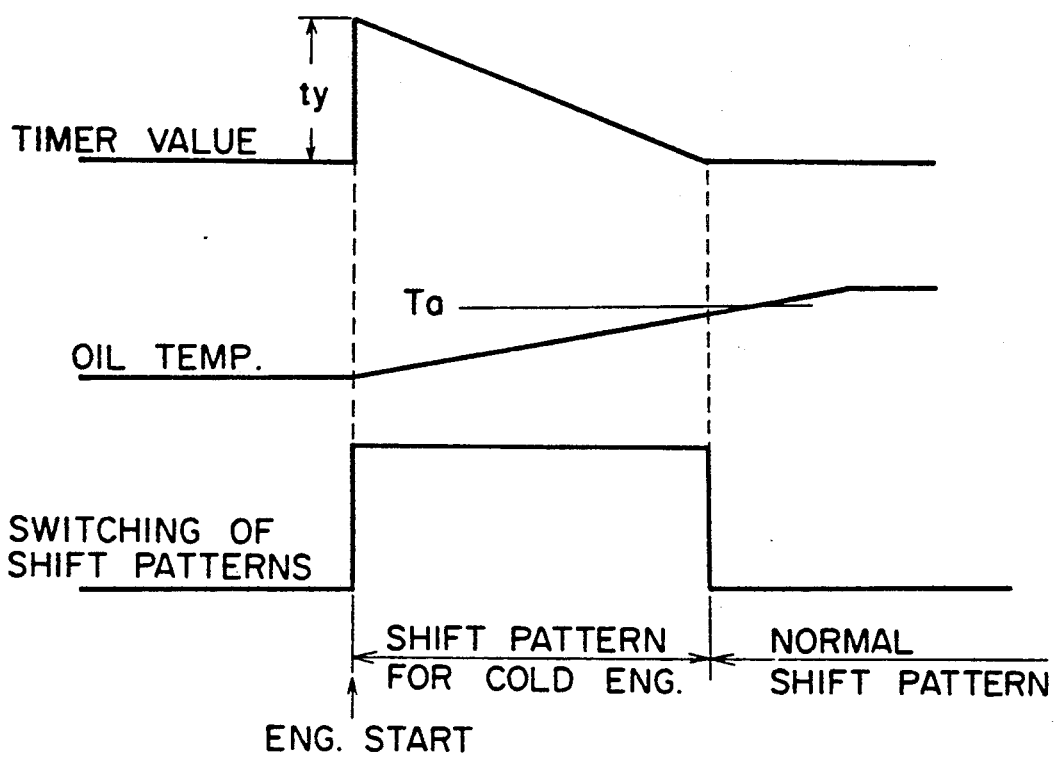
FIGS. 6a and 6b are graphs indicative of switching of shift patterns.
Figure 6B:
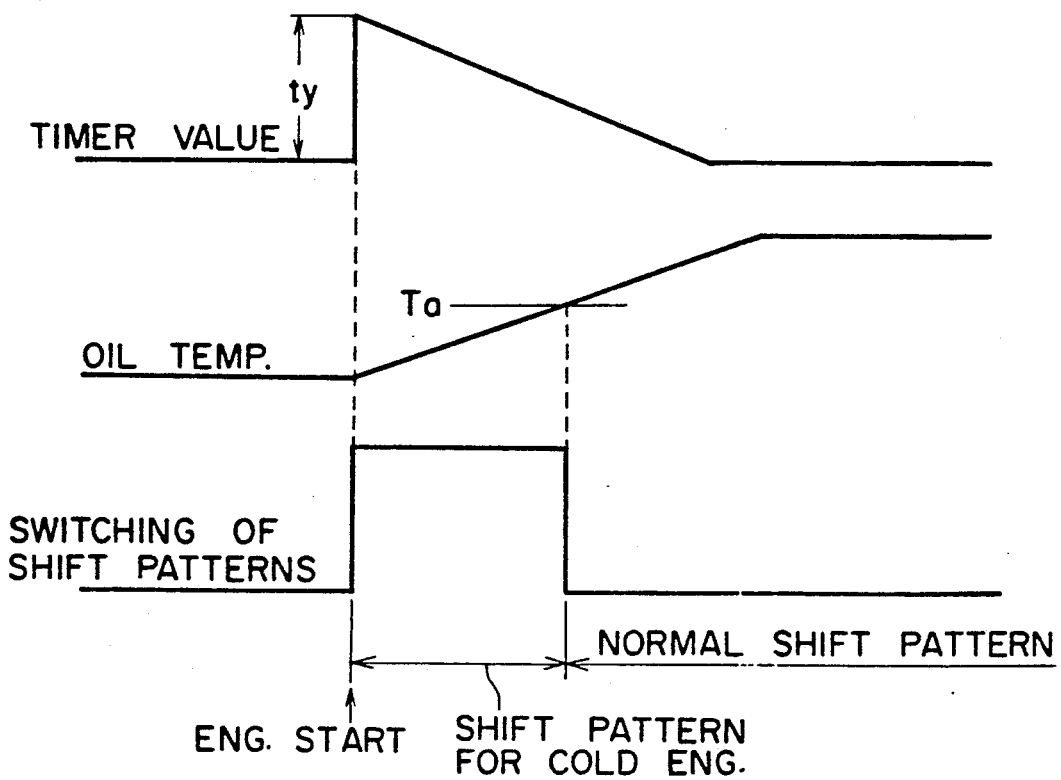

In other words, as shown in FIGS. 6a and 6b, the CPU of the transmission control unit 5 makes the multi-stage transmission 4 select the shift pattern of FIG. 2 favored for the cold engine, until the time set by the internal timer is up after engine starting or until the oil temperature in the torque converter 3 reaches preset value Ta after the engine starting. In the shift pattern of FIG. 2, the running range covered by low speed gears is extended to the high speed side, as compared with the shift pattern of FIG. 3 corresponding to the normal shift pattern appropriate for the engine after warm-up.

On the other hand, when the time set by the internal timer is up after engine starting, the transmission control unit 5 makes the transmission 4 select the normal shift pattern of FIG. 3.

As described above, the higher the oil temperature Tx is at the time of engine starting, the shorter the time period is during which the transmission 4 is under the control of a shift pattern for the cold engine. As a result, the multi-stage transmission mechanism 4 is appropriately controlled by the oil temperature Tx in the torque converter 3.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A control system for an automatic transmission in an automotive vehicle, which selects an appropriate shift pattern in compliance with a temperature of hydraulic oil contained in a torque converter of the automatic transmission, said control system comprising:
   a transmission control unit having a plurality of shift patterns including a first shift pattern favored for a cold engine and a second shift pattern favored for an engine after warm-up;

oil temperature detector means for detecting the temperature of hydraulic oil contained in or supplied to the torque converter;

timer means for counting a time period after engine starting; and shift pattern selector means for selecting said first shift pattern when the temperature of hydraulic oil is less than a preset value, said shift pattern selector means selecting said second shift pattern when the time set by said timer means is up.

2. The control system according to claim 1, wherein said first and second shift patterns have respective shift maps indicative of a relationship between an engine load and a vehicle speed, a running range covered by low speed gears being wider in the shift map of said first shift pattern than in the shift map of said second shift pattern.

3. The control system according to claim 1, wherein a smaller value is set by said timer means as the temperature of hydraulic oil is higher at the time of engine starting.

4. The control system according to claim 1, wherein the time to be set by said timer means is constant when the temperature of hydraulic oil is less than a given value at the time of engine starting, and wherein the time to be set by said timer means linearly reduces with the temperature rise of hydraulic oil when the temperature of hydraulic oil exceeds said given value at the time of engine starting.

5. A control system for an automatic transmission in an automotive vehicle, which selects an appropriate shift pattern in compliance with a temperature of hydraulic oil contained in a torque converter of the automatic transmission, said control system comprising:

a transmission control unit having a plurality of shift patterns including a first shift pattern favored for a cold engine and a second shift pattern favored for an engine after warm-up;

oil temperature detector means for detecting the temperature of hydraulic oil contained in or supplied to the torque converter;

timer means for counting a time period after engine starting; and shift pattern selector means for selecting said first shift pattern when the temperature of hydraulic oil is less than a preset value, said shift pattern selector means selecting said second shift pattern when the time set by said timer means is up or when the temperature of hydraulic oil exceeds said preset value.

* * * * *